United States Patent [19]

Thompson

[11] 4,025,197
[45] May 24, 1977

[54] NOVEL TECHNIQUE FOR SPOT POSITION MEASUREMENT

[75] Inventor: Robert H. Thompson, Drayton Plains, Mich.

[73] Assignee: The Bendix Corporation, Southfield, Mich.

[22] Filed: Aug. 11, 1975

[21] Appl. No.: 603,566

[52] U.S. Cl. .................................. 356/111; 356/172
[51] Int. Cl.² ........................................... G01B 9/00
[58] Field of Search .......... 356/110, 111, 156, 167, 356/170, 172; 250/237 G

[56] References Cited

UNITED STATES PATENTS

| | | | |
|---|---|---|---|
| 2,938,126 | 5/1960 | Adler | 250/568 |
| 3,360,660 | 12/1967 | Kush et al. | 250/237 |
| 3,482,107 | 12/1969 | Hock | 250/237 |
| 3,552,861 | 1/1971 | Albarda | 356/169 |
| 3,628,870 | 12/1971 | Hayamizu | 356/170 |

Primary Examiner—John K. Corbin
Assistant Examiner—Richard Rosenberger
Attorney, Agent, or Firm—James R. Ignatowski

[57] ABSTRACT

An optical device having a diffraction grating displaced from the focal point of a converging monochromatic beam of light for encoding the position of or measuring the displacement of an object or the light beam is disclosed. The diffraction grating, disposed a determinable distance in front of or behind the focal point of the converging light beam, generates a diffraction pattern comprising a plurality of amplitude modulated directional light beams which may be imaged with or without the aid of an intermediate lens. The angular change of the directional light beams comprising the diffraction pattern may be visually or electro-optically detected to encode or provide a measure of the relative displacement between the light beam and the grating.

36 Claims, 10 Drawing Figures

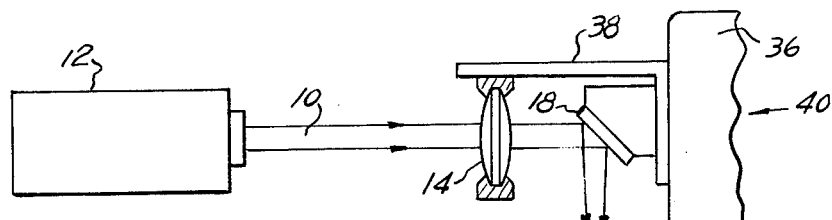
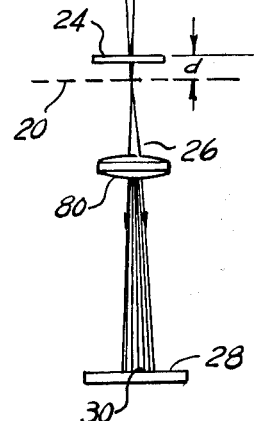
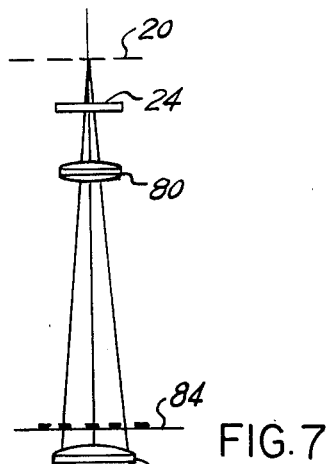
FIG. 7
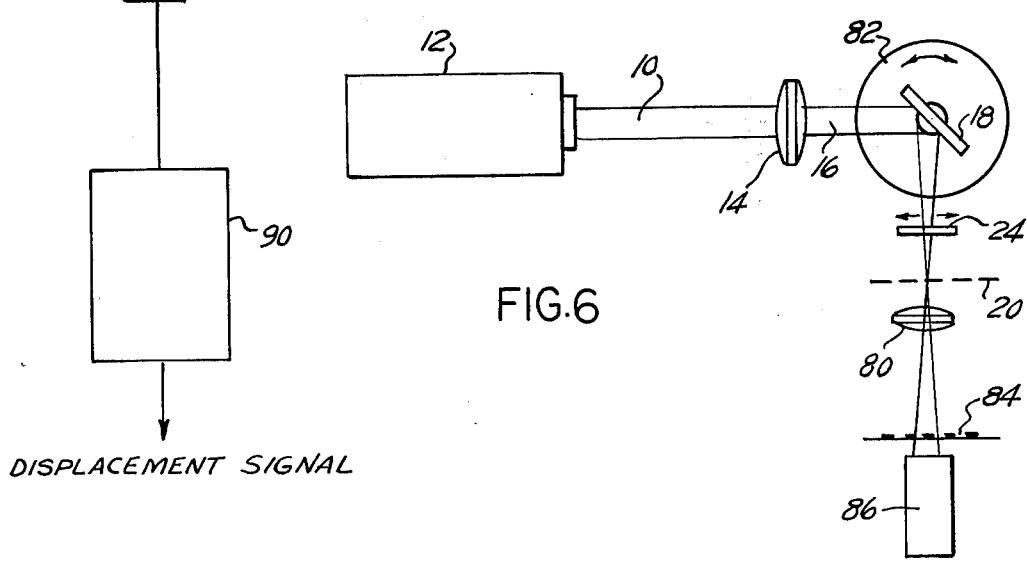
DISPLACEMENT SIGNAL
FIG. 6

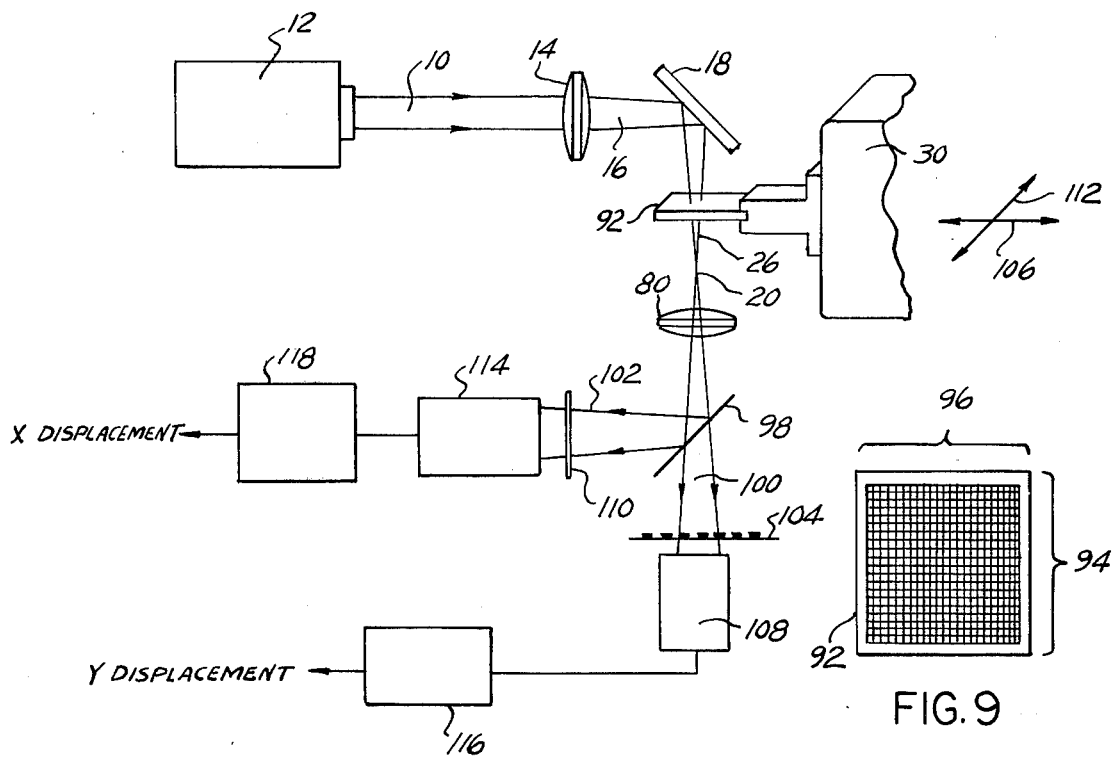
FIG. 8
FIG. 9
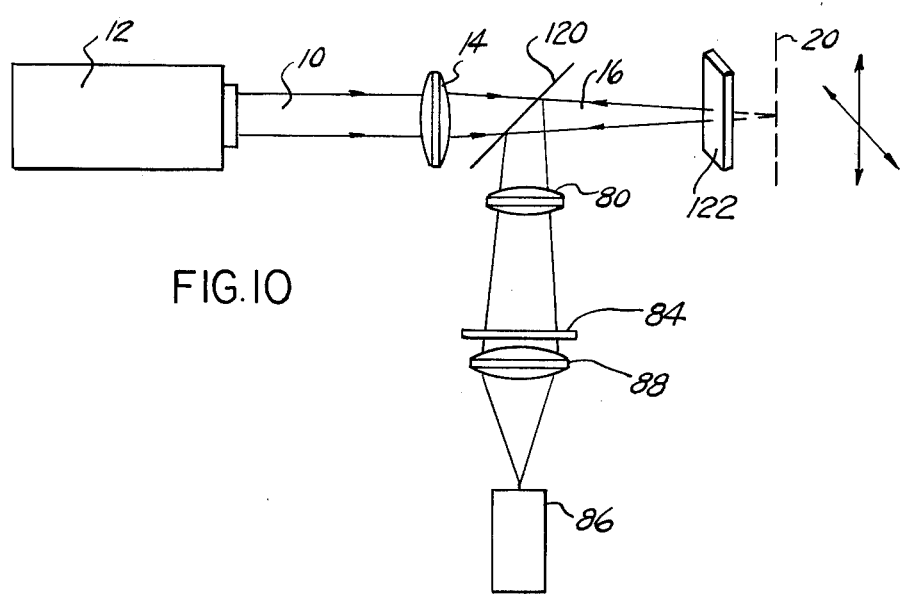
FIG. 10

NOVEL TECHNIQUE FOR SPOT POSITION MEASUREMENT

BACKGROUND OF THE INVENTION

1. Field of the Invention

The invention is related to the general field of displacement detectors and position encoders and, in particular, to the field of optical instruments using gratings for detecting, measuring and encoding the position of an object or light beam.

2. Prior Art

A variety of optical displacement detectors and position encoders, using gratings in one form or another, are well known in the art. The gratings used in these devices may take the form of bar charts, as disclosed by C. E. Adler, U.S. Pat. No. 2,938,126 — "Indicator Scanning Device" or a series of parallel apertures in an otherwise opaque mask, as disclosed by F. Hock, U.S. Pat. No. 3,493,775 — "Optical Scanning Means for Use in Photoelectric Positioning Determining Apparatus". In the simplest forms of these instruments either the image of the grating is scanned across a slit aperture or a slit image scanned across a grating. These systems generally embody a photo detector detecting a transmitted image. The more sophisticated systems use multiple gratings, such as the system disclosed by B. J. Kusch et al., U.S. Pat. No. 3,360,660 — "Position and Rate Readout Systems with Dual Phase Displaced Gratings", in which a slit image is simultaneously scanned across two parallel gratings disposed with their grating patterns out of phase. Other systems, such as disclosed by S. Albarda, U.S. Pat. No. 3,552,861, used two gratings wherein the pattern of the first grating is imaged on the second grating. Alternatively, as disclosed by Y. Hayamizu in U.S. Pat. No. 3,628,870, optical systems may be employed to reimage the grating pattern back on itself to produce a moire fringe pattern when the grating is moved.

The above disclosed systems, however, necessarily embody relatively coarse grating patterns and use well known electronic means for increasing the resolution by measuring a phase relationship between a moving and a stationary grating. A coarse grating is defined in the context of this disclosure as one in which the separation of the elements and the interspacing are sufficiently large so that effects of Fraunhofer differaction is negligible. Coarse gratings are contrasted to diffraction type gratings in which the elements and their interspacings are relatively small and Fraunhofer diffraction is prevalent. The use of diffraction type gratings for position determination is very desirable because of their inherently high resolution, however, the resultant Fraunhofer diffraction effectively degenerates the inherent increased spatial resolution. One solution to this problem is disclosed by F. Hock, U.S. Pat. No. 3,482,107 which uses two phase type diffraction gratings. The diffraction pattern of the first grating is imaged on the second grating so that the interspacing of the diffraction orders corresponds to the grating constant. The dispersion by the second grating is dependent upon the position of the diffraction order images with respect to the dispersion centers of the second grating. Therefore, a small movement of either grating can be measured by detecting the change in the dispersion pattern.

The problems associated with the above types of position measuring devices is their extreme sensitivity with respect to the orientation and location of the two gratings with respect to each other. This condition is aggravated by the fact that the system requires one of the gratings to move with the object whose movement is being detected. This factor places extreme restrictions on both design criteria and possible applications.

The disclosed optical device uses a grating in a manner different from that discussed above and overcomes the attendant problems associated with the detectors of the prior art discussed above.

SUMMARY OF THE INVENTION

The invention is an optical device for detecting very small displacements of an object or light beam to generate displacement and/or position data. The device comprises a monochromatic light source generating a light beam converging to a point focus at a point in space; a diffraction grating disposed along and normal to the axis of the light beam a predeterminable distance from the point in space where the beam converges to a point focus to generate a plurality of angularly separated light beams, each angularly separated beam being a composite of diffracted light from more than one diffraction center of the grating and more than one diffraction order; means associated with the object, the displacement of which is to be detected for producing a like displacement between the light beam and the diffraction grating in the plane of the grating and normal to the grating lines causing an angular displacement of the diffracted light beams indicative of the change in the position of the object.

The key feature of the invention is the displacement of the grating from the focus point of the converging light beam. By selectively displacing the grating a distance from the focal point determinable from the wavelength of the light and the grating constant, various diffracted orders of the incident beam will emerge from the grating along predeterminable paths angularly separated from each other at equal angular intervals. The various diffracted orders emerging at the same angle combine to form a composite beam comprising diffracted light from more than one diffraction segment of the grating. Diffraction segments or elements, as used herein, refers to those portions of the grating from which light forming the diffracted light beams originate, such as the transparent segments of a transmission type grating or the reflective segments of a reflection type grating. These diffraction segments may be either line segments in parallel line gratings or other configurations known in the art.

The angles at which the composite beams emerge from the grating are a function of the angle of the incident light on each diffraction segment of the grating. Therefore, as relative position of the incident beam changes with respect to grating, the angle of the light incident on each diffraction segment changes and causes a proportional change in the angle at which the composite beams emerge providing a measure of the displacement between the incident beam and the grating.

The angular displacement of the beam may be visually detected by imaging the composite beams on an opaque or semi-transparent surface having reference marks from which the displacement can be measured. These reference marks may be one or more marks indicating the position of one light beam or may be in the form of a graduated scale so that incremental angular movements of the composite beams may be determined. In alternate embodiments, the angular displacement of the composite beams may be electro-optically detected using photo detectors, gratings and electronic circuitry well known in the art for generating position and displacement signals. The displacement of the grating may be before or after the focus point of the light beam and the incident light beam may be convergent or divergent.

The disclosed optical device has the following advantages. The detected angularly separated beams are a composite of a plurality of diffraction segments of the grating, therefore, flaws or irregularities on the grating will be averaged out in the composite beams. The composite beams may be imaged without the use of an intermediate auxiliary lens and in embodiments using a secondary grating, there is no required movement of the diffraction grating. These and other advantages of the device will be evident from the reading of the detailed descriptions of the several embodiments illustrated and discussed hereafter.

BRIEF DESCRIPTION OF THE DRAWINGS

FIG. 5 is an optical schematic of an alternate embodiment of the optical device having the grating positioned in a converging light beam.

FIG. 6 is an optical schematic of an alternate embodiment for encoding or measuring a rotational movement.

FIG. 7 is an optical schematic of a portion of the embodiment illustrated in FIG. 1 including a second grating and photo detector.

FIG. 8 is an optical schematic of an alternate embodiment of the device using an X-Y grating and means for detecting displacement in both the X and Y directions.

FIG. 9 is a front view of an X-Y grating.

FIG. 10 is an optical schematic of an alternate embodiment of the device having a reflection grating.

DESCRIPTION OF THE PREFERRED EMBODIMENT

Figure 1:
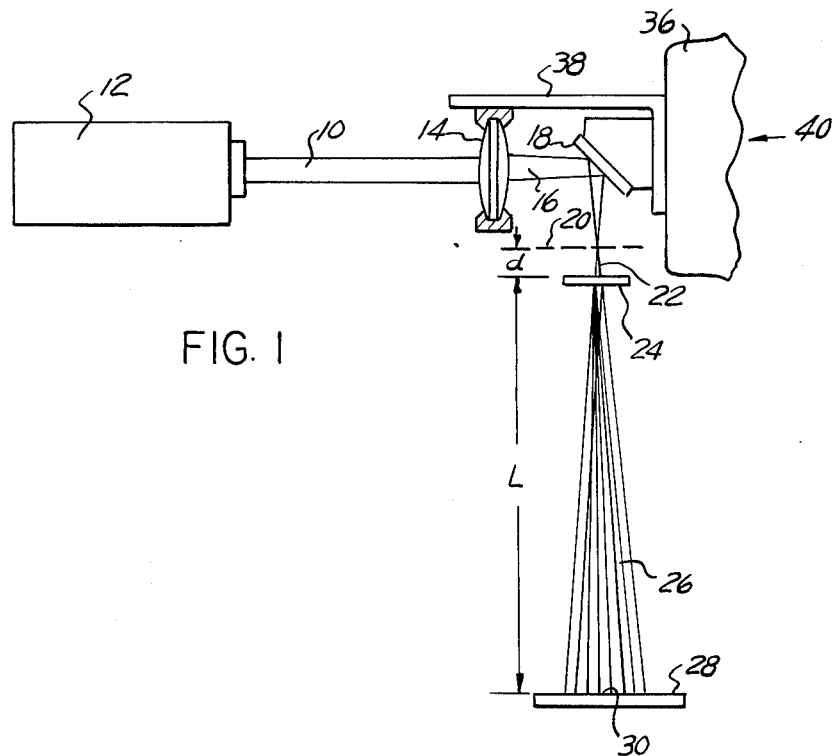
FIG. 1 is an optical schematic of the device showing the component parts.

A preferred embodiment of the inventive optical optical device in one of its more simple forms is illustrated in FIG. 1. A collimated beam of light 10 is emitted from a monochromatic light source 12 and passes through a focusing means, such as lens 14, to form a converging light beams 16. The converging light beam 16 is reflected by a planar mirror 18 angularly disposed relative to the axis of the converging light beam and comes to focus at focal plane 20 of lens 14 to form a point image. Beyond the focal plane 20, hereinafter called the focal point of the beam, converging beam 16 becomes a diverging beam 22 which is incident on a transmission grating 24 disposed normal to the axis of the divergent beam a predeterminable distance $d$ beyond the focal plane 20. The grating lines of grating 24 are disposed normal to the direction of the displacement to be detected. The diverging light beam 22 is diffracted by the transmission grating in accordance with well known optical principles and forms an amplitude modulated distribution of many orders; each order propagating in a different direction within a plane normal to the grating lines. By appropriate selection of the distance $d$, the directions of the various diffracted orders of the beams emerging from the grating within the area illuminated by the diverging beam 22 will coincide to form an amplitude modulated diverging beam 26 which, when imaged on a planar surface 28 a distance "L" beyond the grating 24, will form a diffraction image, such as pattern 30 illustrated in FIG. 2. The image 30 comprises a series of parallel light bars 32 separated by a parallel series of dark bars 34 conventional referred to as fringes. The light and dark fringe image is indicative of the angular dispersion of the modulated beam 26. The two phantom images 33 on the opposite sides of the image 30 are the edges of the first order diffraction images diffracted outside the image area of the central zero order diffraction image 30.

Since the modulation of the diverging beam by the grating is angular rather than spatial, the diffraction image 30 will appear on the planar surface 28 for all values of "L" beyond the grating. In the illustrated embodiment of FIG. 1, the lens 14 and mirror 18 are attached by means of a support bracket 38 to an object 36, the displacement of which is to be detected. For illustrative purposes the displacement of object 36 is linear in the direction indicated by arrow 40. Displacement of the object 36 and the attached lens and mirror in the direction 40 moves the divergent beam 22 across the grating 24 in the direction normal to the grating lines. A beam motion equal to the grating constant, i.e., a distance equal to one opaque and one transparent line on a transmission grating, will cause a comparable one-fringe displacement in the imaged diffraction pattern. Detection of the motion of the fringes in the diffraction pattern may be accomplished by any of the ways disclosed in the prior art. The planar surface on which the diffraction pattern is imaged may be either an opaque, transparent, or a diffusely transparent materials, such as opal or frosted glass. Reference marks inscribed on the planar surface 28 permit the fringes in the image 30 caused by a relative displacement between the beam and the grating to be visually detected. The reference marks may include a graduated scale so that incremented displacement of the fringes can be measured. The movement of the fringes may also be detected using electro-optical techniques or using photo sensors, either alone or in combination with a second grating. Some typical examples will be discussed hereinafter.

Alternatively, the lens 14 and mirror 18 may be stationary and the grating 24 attached to the object 36 and adapted to move therewith is well known in the art.

A key feature of the inventive device is the location of the grating at a determinable distance from the focal point of the beam which results in several advantages over systems embodying direct imaging of the grating itself. First, each line in the generated diffraction pattern is a composite of a plurality of lines on the grating itself, therefore, any flaw or imperfection in one or more grating lines will be averaged out in the image and significantly reduce their effects on the generated images. Secondly, the emerging diffracted beams are in predetermined directions, therefore, no lens or imaging device is required to subsequently image the modulated pattern. Finally, because no lens is required behind the grating, the magnification of the pattern is unlimited.

Noise considerations at high magnifications will limit the maximum magnification in practical applications.

Figure 3:
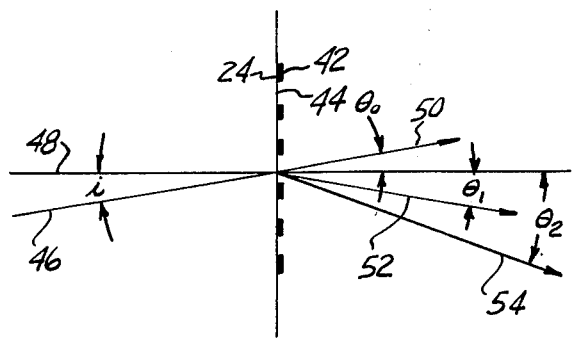
FIG. 3 is an optical schematic showing the angular distribution of the diffracted light beams produced by a transmission grating.

The basic optical principles underlying the advantages cited above are discussed with reference to FIGS. 3 and 4. Referring to FIG. 3, the transmission grating 24 is illustrated as comprising a plurality of equally spaced parallel opaque sections 42 interspaced with a comparable number of diffraction segments illustrated as transparent sections 44. The width of each parallel opaque section may be the same as the width of each parallel transparent section, as shown, or may be different, as is well known in the art. This difference is immaterial to the invention. A thin beam of light 46 equal to or smaller than a transparent section of the grating indicative of a small section of the divergent beam 22 is incident one of the transparent diffraction segments 44 of the grating at an angle designated as $i$ with respect to normal to the grating indicated as line 48. Part of the incident light beam passes through the transparent section of the segment undiffracted and emerges as beam 50 and continues along a path substantially parallel to the incident beam 46. Undiffracted beam 50 is conventionally defined as the zero or undiffracted order of the light beam emerging from the grating. However, in accordance with the well known optical principles, part of the beam 46 will be diffracted as it passes through the segment and emerges as diffracted beam 52 following a path defined by angle $\theta_1$ measured from the normal 48. Other diffracted beams, such as beam 54, will emerge from the grating and follow a path defined by $\theta_2$. Diffracted beam 52 and 54 are defined as the first and second order diffracted beams, respectively. Those familiar in the art will recognize that this is a simple geometrical illustration of Fraunhofer diffraction and that more than just the two illustrated diffracted beams will emerge from the segment and a complementary set of high order diffracted beams will occur on the other side of zero order beam 50 having opposite but equal angular displacements from the zero order beam 50. Because the power in the higher order beams diminish rapidly, only the zero and the first diffracted order on both sides of the zero order need be considered for an understanding of the operation of the invention.

In terms of geometrical optics, the relationship between the incident light beam 46 and the emerging light beams 50, 52 and 54, the wavelength of the light and the grating constant $S$, the distance between the center lines of two adjacent transparent sections is given by the equation:

$$n\lambda = S(\sin i \pm \sin \theta_n)$$

where;
$\theta_n$ = the diffracted angle of the $n^{th}$ order beam with respect to the normal
$n$ = the order of the beam, $n = 0$ for the undiffracted zero order beam, $n = 1$ for the first order beam, $n = 2$ for the second order, etc.
$\lambda$ = the wavelength of the monochromatic beam of light
$S$ = the grating constant
$i$ = the angle of incidence of the incidient beam It can be readily seen from the above equation that given any wavelength $\lambda$ and grating constant $S$, the angle of incidence $i$ can be selected so that the angle $\theta_1$ of the first order diffracted beam will be equal to zero or emerge normal to the plane of the grating, i.e., sin $i$ = $\lambda/S$ and sin $\theta_1 = 0$.

Figure 4:
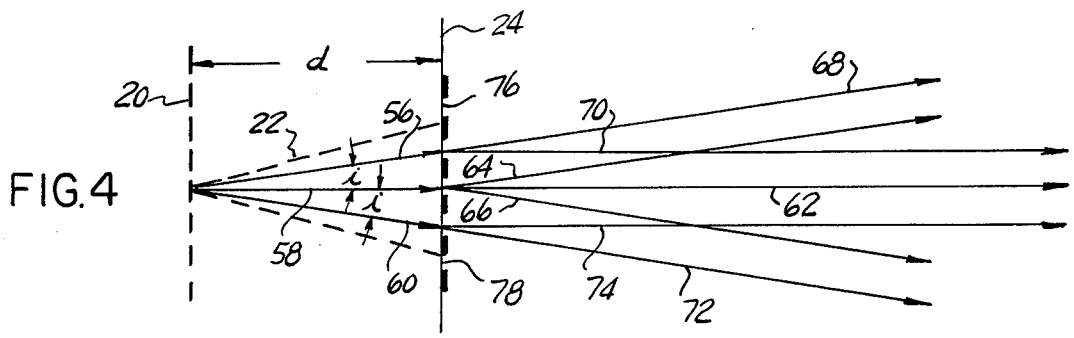
FIG. 4 is an optical schematic of the diffraction produced embodying the principles of the invention.

Referring now to FIG. 4, the transmission grating 24 is shown having three input light beams 56, 58 and 60 passing through three adjacent transparent diffraction segments of the grating. Beam 58 is normally incident on the grating and is diffracted. In addition to the zero order beam 62, two first order diffracted beam 64 and 66 emerge from the opposite side of the grating. The existence of higher order beams is understood but not shown to simplify the drawing and subsequent discussion. Since the angle of incidence $i$ is zero, the angle $\theta_1$ of the two first order beams can be computed from the equation, i.e., when $n = 1$, $i = 0$ and sin $\theta_1 = \pm \lambda/S$.

If the distance $d$ between the grating 24 and the image plane 20 of lens is selected so that beam 56 is incident on an adjacent diffraction segment at an angle $i$ where sin $i = \lambda/S$, then the zero order beam 68 emerges from the grating at the same angle $i$ and the first order beam 70 diffracted clockwise in the illustration emerges normal to the grating, i.e., sin $\theta_1 = 0$. The angle of the first order beam diffracted counter clockwise from the zero order beam (not shown) would emerge at an angle $\theta_1 \approx 2i$. The approximate sign ($\approx$) is used because $i$ is directly proportional to sin $i$ only when the angle $i$ is small. It is seen that the zero order beam 68 of the incidient beam 56 and the first order beam 64 of incident beam 58 both emerge from the grating at the angle $i$ and are parallel. Likewise, the first order beam 70 of incident beam 56 and the zero order beam 62 of incident beam 58 both emerge normal to the grating and also follow parallel paths. By similar analysis, the incident beam 60 will be diffracted by the grating and its zero order beam 72 will emerge parallel to the first order beam 66 of incident beam 58. Also, the first order beam 74 of incident beam 60 will emerge normal to the grating and follow a path parallel to beams 62 and 70. It is to be noted that the second order beam of incident beam 60 would emerge at an angel $\theta_2$ = $i$ and be parallel to emerging beams 64 and 68. Therefore, extending this concept so that the divergent beam 22 would cover more than just the illustrated three diffraction segments of the grating, the basic result would remain the same as long as relationship between the angle $i$ and sin $i$ is approximately linear.

The distance $d$ between the focal point of the beam and the grating 24 is a function of the grating constant $S$ and the wavelength $\lambda$ of the monochromatic beam. Referring to FIG. 4, the distance $d$ can be computed from the equation:

$$d = kS/\tan i$$

where; $kS$ is a distance along the face of the grating in terms of the grating constant $S$ and the integer $k$ where $k = 1, 2, 3$, etc. When the angle $i$ is small, tan $i$ = sin $i$ and, as previously discussed, when the two emerging diffracted beams are parallel, sin $i = \lambda/S$ therefore, $d = kS^2/\lambda$.

Figure 2:
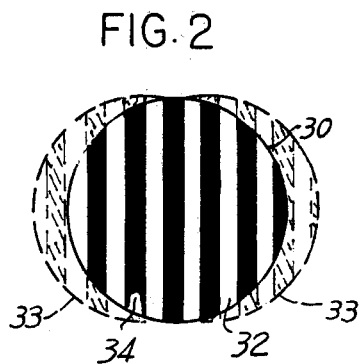
FIG. 2 is an illustration of the diffraction image produced by the optical device.

Placing the grating 24 at a distance from the focal plane 20 different from the periodic distances $d$ calculated from the above equation will cause the beams emerging from adjacent transparent diffraction segments to emerge unparallel and incapable of forming the diffraction image pattern illustrated in FIG. 2. However, another image pattern will reoccur when the distance $d$ is a multiple of $S^2/\lambda$. For example, when the beam passes through the next two adjacent transparent sections indicated as segments 76 and 78 at an angle of incidence equal to $i$ where again, sin $i = \lambda/S$ a fringe pattern will reoccur. This second pattern will comprise two sets of emerging parallel beams, one set being formed by the transparent segments 76 and 78, the second set being formed by the two intermediate transparent segments. Due to the equal spacings between the transparent segments of the gratings and the linear relationship between $i$ and sin $i$, the parallel beams emerging from the intermediate segments will fall between the parallel beams generated by the other set of transparent segments and the number of fringes in the pattern will approximately double. This condition is indicative of the constant $k = 2$. Continued movement of the grating away from the focal point of the beam will cause the diffraction pattern in which beans emerging from various transparent segments are parallel to periodically appear and disappear. As a result, images with various numbers of fringes can be formed using the same grating by an appropriate selecton of the distance $d$. Because each fringe is a composite of diffracted beams emerging a plurality of transparent diffraction segments of the grating, grating flaws and imperfections are averaged out, resulting in a more uniform image pattern.

From the above analysis a person skilled in the art will quickly recognize that the same result would also be obtained if the grating 24 was placed a predetermined distance $d$ in front of the focal point of the beam, as illustrated in FIG. 5, rather than behind it as shown in FIG. 1. However, in this location the relative movement of the fringes in the imaged pattern 30 will be in the opposite direction to the motion produced by the same relative movement between the grating 24 and the impinging beam produced by the arrangement shown in FIG. 1.

The arrangement shown in FIG. 1 has the disadvantage in that the whole imaged fringe pattern will have a lateral displacement equal to the displacement of the reflected beam 22. When L is large, this displacement of the image may be negligible for many applications. However, where the use of a large distance L is prohibited, such as designing the system into a compact package, or when a precise measurement is required, this lateral displacement of the image may be eliminated by incorporating a second lens 80 between the grating 24 and the image plane 28, as shown on FIG. 5. Each composite beam emerging from the grating emerges at a predetermined angle, therefore, the image produced by the lens is insensitive to the lateral displacement of the beam impinging on the grating. The position of the image produced by lens 80 does not move with movement of the beam, however, the individual fringes in the image will move, as discussed above. Common elements of FIGS. 1 and 5 have the same identifying indicia.

The basic concepts of the measurement systems can be extended to the measurement of small angular rotations, as well as linear displacements, as indicated in FIG. 6. The convergent beam 16 is deflected by mirror 18 attached to the object 82, the rotation of which is to be measured. A small angular rotation of the mirror 18 will move the beam across the grating 24 comparable to the way previously described with reference to a linear motion in FIG. 1 producing a shift of the fringes in the image. A second grating 84 having opaque and transparent segments corresponding in size and spacings to imaged fringe pattern is included in the system illustrated in FIG. 6. The diffracted image pattern is imaged on the grating 84 by a lens 80 and the change of light transmitted through the second grating indicative of a change in the position of the fringes corresponding to a relative displacement between the beam 22 and grating 24 is detected by detector 86 using methods well known in the art, such as described by F. Hock U.S. Pat. No. 3,482,107 or by Y. Hajamizu, U.S. Pat. No. 3,628,870. The second grating 84 may also be a plurality of gratings having predetermined displaced phase relationships, as taught by B. J. Kusch et al. in U.S. Pat. No. 3,360,660 to provide a motion or displacement measurements from the generated image pattern.

FIG. 7 is an alternate embodiment in which an auxiliary lens 88 is placed between the second grating 84 and the detector 86. The auxiliary lens focuses the light passing through the grating onto the photo sensitive area of the detector. The output of the detector is received by an appropriate electronic circuit 90 to produce an output signal which may be an absolute measurement of the displacement or an encoded signal giving the absolute position of the beam or object, as is well known in the art.

The grating 24 of the preceding embodiment may be replaced with an X-Y grating 92 illustrated in FIG. 9. The X-Y grating may be a single element having two sets of parallel grating lines 94 and 96 respectively disposed normal to each other, or the X-Y grating may be two parallel line gratings placed back to back with grating lines of one grating normal to the grating lines of the second. Referring to FIG. 8, the convergent monochromatic light beam 16 is incident on an X-Y grating 92 disposed before the focal point 20. The modulated beam 26 emerging from the X-Y grating is split by an optical beam splitter 98 into two separate beams 100 and 102. The beam 100 is imaged on a first complementary parallel line grating 104 having its lines disposed parallel to one of the two sets of parallel lines on the X-Y grating and the motion of the grating in one direction indicated by two-headed arrow 106 measured by detector 108. The beam 102 is imaged on a second parallel line grating 110 having its lines disposed optically parallel to the other of the two sets of parallel lines on the X-Y grating. The motion of the grating in a direction indicated by two-headed arrow 112 is detected by detector 114. Electronic circuits 116 and 118 respectively are well known circuits for generating displacement or position data from the detected diffraction pattern after passing through the gratings 104 and 110 respectively.

The grating need not be a transmission grating, as grating 24 in FIGS. 1, 5 and 8 but may be a reflective grating, as shown in FIG. 10. The light source 12 generates a collimated beam 10 which is converted to a convergent beam 16 by lens 14, as discussed with reference to the prior embodiments. The convergent beam 16 passes through a beam splitter 120 and is diffracted by a reflective grating 122 disposed normal to the beam 16 and displaced from the image plane 20 where the beam 16 would have come to a point focus. The reflected beam diffracted of the grating 122 is reflected by the beam splitter 120 and imaged on a corresponding grating 84. The relative displacement between the diffraction pattern generated and the reflective grating and the corresponding grating 84 is determined by the detector 86. As discussed relative to prior systems, the grating may be attached to the object whose motion is to be measured, or the position of the grating may be fixed and the beam may be moved. The diffracted image generated by the reflective grating will be substantially the same as that formed by a transmission grating.

The basic concept of detecting the relative displacement between a convergent light beam and a grating displaced a determinable distance from the focal point of the converging light beam has been disclosed. Further, various devices for measuring and encoding the displacement have been illustrated. It is also recognized that many alternate embodiments exist, the discussion of which are too numerous to be included herein. The illustrated and discussed embodiments show some of the ways in which the basic concept of the invention may be used for measuring physical displacements or position encoding and are not intended to limit the scope of the invention.

What is claimed is:

1. An optical device comprising:
   means for generating a monochromatic beam of light of wavelength λ converging along an axis to a point focus at a predetermined point in space;
   means disposed along and normal to the axis of said beam of light a determinable distance from said predeterminable point in space for diffracting said light beam in at least one plane to generate a plurality of angularly separated composite beams; and
   means detecting the angular displacement of said composite beams for determining a lateral displacement between said incident beam and said means for diffracting in a direction parallel to said at least one plane of diffraction.

2. The optical device of claim 1 wherein said means for diffracting is a diffraction grating having a plurality of parallel diffraction elements, each diffraction element equally spaced from each adjacent diffraction element by a grating constant S and wherein said determinable distance is determinable from said wavelength λ and said grating constant S; and wherein said monochromatic beam is diffracted in a plane normal to said parallel diffraction elements.

3. The optical device of claim 2 wherein said determinable distance $d$ may be computed from the equation $d = kS^2/\lambda$, wherein;
   $k$ is an integer 1, 2, 3, 4, etc.;
   $S$ is the grating constant of said diffraction grating; and
   $\lambda$ is the wavelength of the monochromatic light source.

4. The optical device of claim 2 wherein said diffraction is a transmission diffraction grating.

5. The optical device of claim 2 wherein said diffraction grating is a reflection diffraction grating.

6. The optical device of claim 2 wherein said diffraction grating is a phase diffraction grating.

7. The optical device of claim 2 wherein said means for determining a lateral displacement includes:
   means disposed a predetermined distance behind said diffraction grating for imaging the angularly separated composite beams, said imaged composite beams forming a diffraction image having a set of equally spaced light and dark bars; and
   means for visually determining the displacement of the bars in the diffraction image when the relative position between the incident beam and the diffraction grating is changed.

8. The optical device of claim 7 wherein said means for determining further includes a lens disposed behind said diffraction grating to focus said composite beams on said means for imaging.

9. The optical device of claim 2 wherein said means for determining includes means for electro-optically detecting said composite to generate a signal indicative of the displacement of the angularly separated composite light beams when the relative position between said light beam and said diffraction grating changes.

10. The optical device of claim 9 wherein said means for electro-optically detecting includes at least one photo detector having a receiving area of a predetermined size generating electrical signals having a value indicative of the portion of a composite beam incident on said receiving area and means for generating a signal indicative of the displacement in response to the signals generated by the photo detector.

11. The optical device of claim 10 wherein said means for measuring further includes a lens disposed between said diffraction grating and said photo detector for imaging said angularly separated composite beams in a plane containing receiving area of said photo detector.

12. The optical device of claim 9 wherein said electro-optically detecting means comprises:
   a transmission grating having alternating transparent and opaque parallel elements and a grating constant substantially larger than diffraction grating, said transmission grating disposed a predetermined distance from said diffraction grating with said alternating transparent and opaque parallel elements being disposed substantially parallel to the diffraction elements of said diffraction grating;
   a lens disposed between said diffraction grating and said transmission grating for imaging said angularly separated composite beams on said transmission grating, the spacing between adjacent dark bars of the imaged composite beams being substantially equal to the grating constant of said transmission grating; and
   a detector for generating a signal proportional to the portion of the image composite beams transmitted through the transparent elements of said transmission grating.

13. The optical device of claim 12 wherein said electro-optical detector further includes circuit means for generating a signal indicative of the relative displacement between the incident beam and said diffraction grating in response to the signal generated by said detector.

14. The optical device of claim 1 wherein;
   said means for diffracting is an X-Y diffraction grating having two orthogonally disposed sets of parallel diffraction elements angularly diffracting said monochromatic beam of light in two orthogonal directions to generate a diffracted beam having two sets of angularly separated composite beams; and wherein
   said means for determining the lateral displacement includes means for detecting the angular displacement of said composite beams in each orthogonal direction for determining a lateral displacement between the incident light beam and the X-Y grating along said two orthogonal directions.

15. The optical device of claim 14 wherein said means for determining the lateral displacement includes a first transmission grating having alternating transparent and opaque parallel elements, said first transmission grating disposed a first predetermined distance from said X-Y grating to receive said orthogonally disposed diffracted beams, said alternating transparent and opaque parallel elements of said first transmission grating being substantially parallel to one set of diffraction elements of the X-Y grating and the separation of the transparent elements of said first transmission grating being equal to the distance between the angularly separated light beams diffracted by said one set of diffraction elements at said first predetermined distance;

a first detector disposed behind said first transmission grating to generate a signal indicative of the displacement between the incident beam and said X-Y grating in a lateral directon normal to said first set of diffraction elements;

beam splitter disposed between said X-Y grating and said first transmission grating for deflecting a portion of the diffracted beam in a direction substantially different from the direction of the undeflected portion of said diffracted beam;

a second transmission grating having alternating transparent and opaque parallel elements, said second transmission grating disposed along the path of said deflected portion of the diffracted beam a second predetermined distance from said beam splitter, said alternating transparent and opaque parallel elements of said second transmission grating being substantially parallel to the angularly separated composite beams diffracted by the other set of diffraction elements of the X-Y grating and the separation of the transparent elements of said second transmission grating being equal to the distance between the angularly separated composite beams diffracted by said other set of diffraction elements of said second predetermined distance; and a second detector disposed behind and receiving the light transmitted by said second transmission grating for generating a signal indicative of the displacement between the incident beam of light and said X-Y grating in a lateral direction normal to said other set of diffraction elements.

16. The optical device of claim 15 further including electronic circuit means for generating a signal indicative of the lateral displacement between said incident beam and said X-Y diffraction grating in response to the signals generated by said first and said second detector.

17. The optical device of claim 15 further including electronic circuit means for generating a coded signal indicative of the position of said beam with respect to said X-Y grating in response to the signals generated by said first and second detectors.

18. An instrument for detecting the displacement of an object comprising:

means for generating a monochromatic beam of light of wavelength λ converging along an axis to a point focus at a predetermined point in space;

diffraction grating means having a grating constant $S$ disposed along and normal to said axis a determinable distance from said predetermined point in space for diffracting said incident light beam in at least one plane to form a diffracted beam having a plurality of angularly separated composite beams;

means for displacing the location between said light beam and said diffraction grating in response to the displacement of said object; and means disposed a predetermined distance behind said diffracting grating for detecting the angular displacement of at least one composite beam caused by the displacement between said light beam and said diffraction grating.

19. The instrument of claim 18 wherein the determinable distance $d$, said grating is disposed from said predetermined point in space may be computed from the equation:

$$d = \pm kS^2/\lambda$$

where;

$d$ is the distance between the grating and the predetermined point in space;

$k$ is an integer $\lambda$ is the wavelength of said incident beam of light;

$S$ is the grating constant; and $\pm$ indicates the grating may be placed before or behind the point in space along said axis.

20. The instrument of claim 19 wherein said means for displacing is a means for laterally displacing said transmission grating with respect to said incident beam.

21. The instrument of claim 19 wherein said means for displacing is a means for laterally displacing the incident light beam with respect to said transmission grating.

22. The instrument of claim 19 wherein the displacement of the object is a rotation about an axis normal to the axis of the incident beam, said means for displacing the incident light beam comprises a reflective surface fixedly attached to the object and adapted to rotate therewith for reflecting said incident light beam to said diffraction grating; wherein the rotation of said reflective surface with the rotation of the object displaces the position of reflected beam on the surface of the diffraction grating.

23. The instrument of claim 19 wherein said means for detecting includes a means disposed a predetermined distance behind said grating for imaging the diffracted beam to form a diffraction image having a plurality of alternating light and dark bars and means for visually determining the displacement of said alternating bars when the relative position between the incident beam and the diffraction grating is changed.

24. The instrument of claim 23 wherein said means for detecting further includes a lens disposed behind said diffraction grating to focus said diffracted beam on said means for imaging and said means for visually determining further includes graduated reference marks disposed on said means for imaging to incrementally indicate the displacement of at least one bar in said diffraction image.

25. The instrument of claim 18 wherein said means for detecting is a means electro-optically detecting the angular displacement of at least one of said composite beams for generating a signal indicative of the lateral displacement between the incident light beam and the diffraction grating.

26. The instrument of claim 25 wherein said electro-optically detecting means includes at least one photo detector having a receiving area of a predetermined size for generating signals indicative of the portion of said at least one composite beam incident on the receiving area.

27. The instrument of claim 26 wherein said at least one photo detector is one photo detector, the width of the receiving area of said photo detector being approximately equal to the width of said at least one composite beam incident on said photo detector, and said signals being indicative of the portion of a composite beam incident on said receiving area.

28. The instrument of claim 26 wherein said at least one photo detector is a plurality of photo detectors, the width of the receiving areas of each photo-detector being substantially less than the width of a composite beam incident on the detector, said plurality of detectors being disposed to receive a different portion of the composite beams; and
   wherein said means for electro-optically detecting further includes circuit means receiving signals from said plurality of detectors for generating signals indicative of the displacement between said incident light beam and said grating.

29. The instrument of claim 26 wherein said means for electro-optically detecting includes a lens disposed behind said diffraction grating focusing said diffracted beam in a plane containing the receiving areas of said detectors.

30. The instrument of claim 26 wherein said electro-optically detecting means comprises:
   a transmission grating having alternating transparent and opaque parallel elements disposed a predetermined distance from said diffraction grating, said alternating transparent and opaque elements being disposed substantially parallel to the parallel diffraction elements of said diffraction grating;
   a lens disposed between said diffraction grating and said transmission grating imaging said composite beams on said transmission grating, the spacing between said imaged composite beams being equal to the spacing between adjacent transparent elements of said transmission grating; and
   detector means for generating a signal proportional to the portion of the imaged composite beams passing through the transparent elements of said transmission grating.

31. The instrument of claim 30 wherein said electro-optical detection means further includes electronic circuit means for generating a signal indicative of displacement of the object from one position to another in response to the signals generated by said detector means.

32. The instrument of claim 30 wherein said electro-optical detection means further includes electronic means for generating a signal indicative of the object's position in response to the signals generated by said detector means.

33. The instrument of claim 18 wherein the displacement of the object to be detected is in two directions;
   said grating is an X-Y grating having two sets of orthogonally disposed diffraction elements angularly diffracting said incident beam to generate a diffracted beam comprising two orthogonally disposed sets of angularly separated composite beams;
   said means for displacing includes means for displacing the relative position between said incident beam and said X-Y grating in response to the displacement of the object in said two directions causing one orthogonal set of composite beams to be angularly displaced proportional to the displacement of the object in one of said two directions and causing the other orthogonal set of composite beams to be angularly displaced proportional to the displacement of the object in the other of said two directions; and
   said means for detecting includes means for individually detecting the displacement of said two sets of composite beams caused by a displacement of said objects in said two directions.

34. The instrument of claim 33 wherein said means for individually detecting includes;
   a first transmission grating having alternating transparent and opaque elements, said first transmission grating disposed a first predetermined distance from said X-Y grating to receive one set of said orthogonally disposed composite beams, said alternating transparent and opaque parallel elements being substantially parallel to one set of diffraction elements of said X-Y grating and the separation of the transparent elements of said first transmission grating being equal to the distance between said composite beams diffracted by said one set of diffraction elements at said first predetermined distance;
   a first detector disposed behind said first transmission grating generating a signal indicative of the displacement of at least one composite beams diffracted by said one set of diffraction elements;
   a beam splitter disposed between said X-Y grating and said first transmission grating for deflecting a portion of the diffracted beam in a direction substantially different from undeflected portion of said diffracted beam;
   a second transmission grating having alternating transparent and opaque parallel elements, said second transmission grating disposed along path of said deflected portion of the diffracted beam a predetermined distance from said beam splitter, said alternating transparent and opaque parallel elements of said second transmission grating being substantially parallel to the composite beams diffracted by the other set of diffraction elements and the separation of the transparent elements of said second transmission grating being equal to the distance between the composite beams diffracted by said other set of diffraction elements incident on said second transmission grating; and
   a second detector disposed behind and receiving the light transmitted by said second transmission grating generating a signal indicative of the displacement of at least one composite beam diffracted by said other set of grating lines.

35. The instrument of claim 34 further including electronic circuit means for generating a signal indicative of the displacement of the object in response to the signals generated by said first and second detector.

36. The optical device of claim 34 further including electronic circuit means for generating a coded signal indicative of the position of said object in response to the signals generated by said first and second detectors.

* * * * *

UNITED STATES PATENT AND TRADEMARK OFFICE
CERTIFICATE OF CORRECTION

PATENT NO. : 4,025,197
DATED : May 24, 1977
INVENTOR(S) : Robert H. Thompson

It is certified that error appears in the above-identified patent and that said Letters Patent are hereby corrected as shown below:

Col. 2, line 25, first word "diffraction" should be ---diffracted---.

Col. 4, line 8, after "28" insert ---disposed---.

Col. 7, line 16, delete "beans" insert ---beams---.

Col. 7, line 20, delete "selecton" insert ---selection---.

Claim 34. Col. 14, line 29, delete "beams" insert ---beam---.

Signed and Sealed this

Twenty-seventh Day of September 197

[SEAL]

Attest:

RUTH C. MASON
Attesting Officer

LUTRELLE F. PARKER
Acting Commissioner of Patents and Trademark